US012674668B2

(12) United States Patent
Joet et al.

(10) Patent No.: US 12,674,668 B2
(45) Date of Patent: Jul. 7, 2026

(54) MICRO-ELECTRO-MECHANICAL DEVICE

(71) Applicant: COMMISSARIAT À L'ENERGIE ATOMIQUE ET AUX ENERGIES ALTERNATIVES, Paris (FR)

(72) Inventors: Loïc Joet, Grenoble Cedex (FR); Patrice Rey, Grenoble Cedex (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 320 days.

(21) Appl. No.: 18/481,509

(22) Filed: Oct. 5, 2023

(65) Prior Publication Data
US 2024/0118082 A1 Apr. 11, 2024

(30) Foreign Application Priority Data

Oct. 5, 2022 (FR) ...................................... 2210219

(51) Int. Cl.
*G01C 19/5747* (2012.01)
(52) U.S. Cl.
CPC ................................. *G01C 19/5747* (2013.01)
(58) Field of Classification Search
None
See application file for complete search history.

(56) References Cited

U.S. PATENT DOCUMENTS

| | | | |
|---|---|---|---|
| 8,261,614 B2 | 9/2012 | Hartmann et al. | |
| 2010/0122577 A1* | 5/2010 | Neul ..................... | G01C 19/574 |
| | | | 73/504.12 |
| 2011/0308314 A1 | 12/2011 | Kempe | |
| 2018/0340775 A1* | 11/2018 | Kuisma .............. | G01C 19/5642 |
| 2020/0096338 A1* | 3/2020 | Ruohio .............. | G01C 19/5747 |
| 2021/0293847 A1* | 9/2021 | Liukku ................... | G01P 15/18 |
| 2023/0228790 A1* | 7/2023 | Rytkönen ................ | G01P 15/18 |
| | | | 73/514.35 |

FOREIGN PATENT DOCUMENTS

| | | |
|---|---|---|
| DE | 10 2009 046506 A1 | 5/2011 |
| EP | 3 407 016 A1 | 11/2018 |

OTHER PUBLICATIONS

ER Search Report as issued in French Patent Application No. FR2210219, dated Apr. 17, 2023.

* cited by examiner

*Primary Examiner* — Mark A Shabman
(74) *Attorney, Agent, or Firm* — CUSHMAN PARTNERS, LLC

(57) ABSTRACT
A micro-electromechanical device includes a frame; a proof mass connected to the frame through a first mechanical link which allows pivoting of the proof mass to relative to the frame about a first axis of rotation parallel to a mean plane of the frame; and a lever for detecting pivoting of the mass, connected to the proof mass through a second mechanical link allowing rotation of the lever relative to the proof mass about a second axis. The second link includes two walls connecting perpendicularly to each other, one to the lever and the other to the proof mass, one of the walls being parallel to the second axis of rotation.

11 Claims, 12 Drawing Sheets

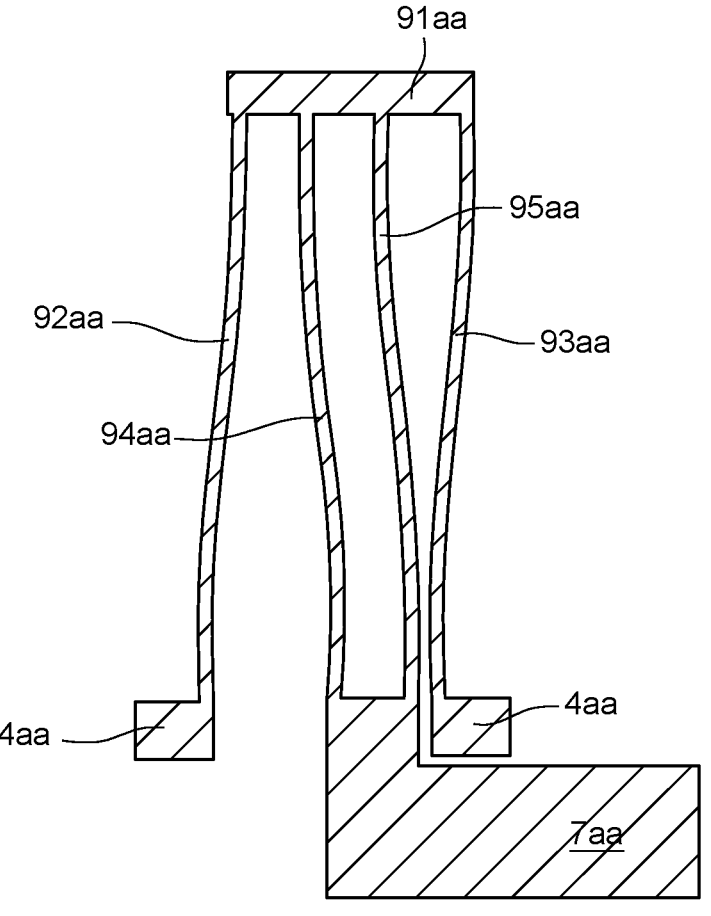
Fig. 3
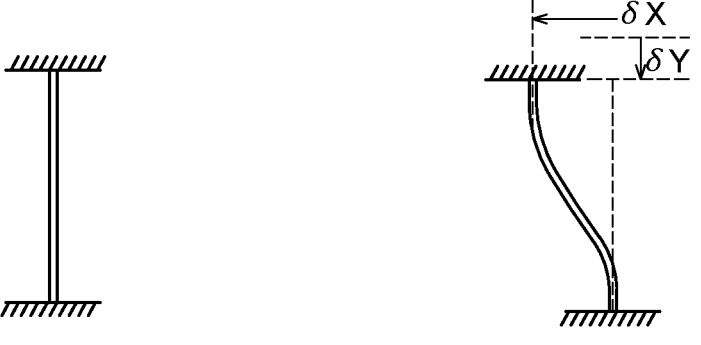
Fig. 4          Fig. 5

MICRO-ELECTRO-MECHANICAL DEVICE

CROSS-REFERENCE TO RELATED APPLICATIONS

This application claims priority to French Patent Application No. 2210219, filed Oct. 5, 2022, the entire content of which is incorporated herein by reference in its entirety.

FIELD

The technical field of the invention is that of micro-electro-mechanical systems (MEMS). The invention relates in particular to such a device used as an inertial sensor, and comprising a proof mass which can pivot relative to a frame or support under the effect of the forces it undergoes.

BACKGROUND

Different types of micro-electro-mechanical gyrometers have been developed in recent years, in particular "out-of-plane" movement gyrometers, such as the one schematically represented in FIG. 1, which make it possible to measure a speed of rotation about an axis Y parallel to the mean plane of the substrate from which the gyrometer 1*aa* is made.

Most of this substrate forms a thick layer that serves as a support 2*aa*. The gyrometer 1*aa* comprises two movable frames 3*aa* and 3*aa'*, parallel to the support and each guided for displacement with respect to this support 2*aa*, along an axis X which is parallel to the support 2*aa* (parallel to the substrate), and perpendicular to the rotation angular velocity measurement axis, Y. During operation of the gyrometer, the two frames are moved, for example by electrostatic actuation by means of interdigital combs (not represented), so as to oscillate parallel to the axis X, in phase opposition to each other (symmetrically). The two frames then move at speeds of displacement opposite to each other relative to the support 2*aa*.

Each frame 3*aa*, 3*aa'* drives a proof mass 4*aa*, 4*aa'* (also called Coriolis mass) therewith, which is connected to the frame through a first link 5*aa*, 5*aa'*, allowing the proof mass to pivot about an axis of rotation $\Delta_1$, $\Delta_1'$ (link axis) parallel to the axis Y. This link is therefore partly similar to a pivot connection, or stated differently, a hinge.

Each proof mass 4*aa*, 4*aa'* is additionally connected to a pivot detection lever common to both masses, 7*aa*, via a second mechanical link 9*aa*, 9*aa'*. This lever 7*aa* pivots about a detection axis $\Delta_3$, which is parallel to the axis Y and is fixed with respect to the support 2*aa*. The lever 7*aa* is located in the central zone of the gyrometer, between the two proof masses.

When the gyrometer 1*aa* rotates (i.e.: when the support 2*aa* rotates) relative to an inertial (Galilean) reference frame, about the axis Y, with an angular velocity $\overrightarrow{\Omega} = \Omega \overrightarrow{y}$, each mass 4*aa*, 4*aa'* then undergoes a Coriolis force, which is expressed as $\overrightarrow{F}_{cor} = 2\, m_{cor}\, (\overrightarrow{v} \wedge \overrightarrow{\Omega}) = 2(\omega \overrightarrow{y})$ where $m_{cor}$ represents the mass of any one of these two proof masses 4*aa*, 4*aa'* and where v is its velocity of displacement (along the axis X). This ("out-of-plane") force is therefore directed along an axis Z perpendicular to the support 2*aa*, and it is of the same amplitude but in opposite directions for the two proof masses 4*aa* and 4*aa'* (since the two masses are driven in opposite directions). For each mass, this force therefore causes an out-of-plane displacement of the mass (more precisely, a displacement of one movable end of the mass, in a direction parallel to the axis Z). This force causes the mass to pivot about its axis of rotation (the axis of the mass-frame link). This out-of-plane displacement occurs in an opposite direction for the two masses. The out-of-plane displacement of these two masses then causes the detection lever 7*aa* to rotate about the detection axis $\Delta_3$. This rotation of the lever is then measured, for example by means of strain gauges (piezo-resistive, piezo-electric or resonant detection) to deduce the angular velocity $\Omega$ thereof.

In a gyrometer such as this, it is known to make the second links 9*aa*, 9*aa'* as is represented in FIG. 2. These two links 9*aa* and 9*aa'* are generally identical to each other. The link 9*aa* comprises two half-links, respectively located on one side and the other side of the lever, on either side of a plane of symmetry Ps of the mass-lever assembly (plane of symmetry which is perpendicular to the axis Y). The two half-links in question are facing each other. They are symmetrical to each other in relation to this plane of symmetry. FIG. 2 shows one of these two half-links.

This half-link comprises four "beams" 92*aa*, 93*aa*, 94*aa*, 95*aa*, each forming a thin wall extending parallel to the axes Y and Z (and therefore perpendicular to the mean plane of the gyrometer). Two of these beams, 93*aa* and 94*aa*, located side by side (they occupy slightly different positions along the axis X), are each rigidly connected on one side to the lever 7*aa*, and on the other side to a connecting element 91*aa*. The other two beams 92*aa* and 93*aa* are each rigidly connected on one side to the mass 4*aa*, and on the other side to the connecting element 91*aa*. The pair of beams 94*aa*, 95*aa* is located between beam 92*aa* and beam 93*aa*. The connecting element 91*aa* connects only to the four beams in question, thus forming a kind of movable island.

During operation of the gyrometer, the frames and masses oscillate along the axis X, while the lever 7*aa* remains fixed (apart from its pivoting movement about the axis $\Delta_3$). The second links 9*aa*, 9*aa'* should therefore allow the mass 4*aa*, 4*aa'* to move relative to the lever 7*aa* along the axis X, with a very large amplitude. Indeed, the amplitude of oscillation of the frames, and therefore of the masses, along the axis X, is typically between a few microns and a few tens of microns, which is a very large displacement for a MEMS. In links 9*aa*, 9*aa'*, this large latitude of movement is delivered by flexibility of the beams, having an elongate shape along the axis Y (long length b), and not very thick in the axis X (narrow width a). FIG. 3 very schematically illustrates this deformation of the beams when the mass 4*aa* is moved in the direction X.

More generally, in such a gyrometer, it is desirable that the link between the proof mass and the detection lever:

be able to transmit a force parallel to the axis Z, while deforming little in this direction (i.e.: high stiffness of the link along the axis Z), so that the mass can drive the detection lever therewith along a direction parallel to the axis Z, effectively, when it pivots, allows a large relative displacement in the direction X, with low stiffness with respect to this displacement, and with low non-linearity (to avoid introducing undesirable sources of non-linearity into the dynamics of movement of the mass-frame assembly, which linearity is not easy to achieve given the amplitudes of X displacement), and has a low rotational stiffness with respect to rotation of the lever relative to the mass, about an axis of the link, $\Delta_2$, $\Delta_2'$, parallel to the axis Y.

When the mass pivots relative to the frame, it drives one end of the lever therewith in the direction Z, causing the lever to rotate about its axis $\Delta_3$. During this movement, it is noticed that both the mass and the lever pivot relative to each other. The second link $9aa$ should therefore allow, at least in part, this rotation of the mass relative to the lever, about the axis $\Delta_2$, $\Delta_2'$ of the link.

With regard to criterion c), it is noticed that the sources of elastic stiffness which oppose to the pivoting of the proof mass $4aa$ include: the rotational stiffness due to the first link $5aa$ (rotational stiffness about the axis $\Delta_1$), the rotational stiffness due to the second link $9aa$ (rotational stiffness about the axis $\Delta_2$), as well as the stiffness of the strain gauge(s) themselves (employed to measure rotation of the detection lever) and of the hinge associated therewith. Now, among these contributions, it is desirable to minimise stiffness that is not due to the gauges themselves, so that as much energy as possible is directed towards the gauges in order to maximise the rotation measurement signal (in terms of detection and from an energy point of view, it is desirable to avoid storing energy—in the form of elastic energy—in the mechanical links $5aa$ and $9aa$).

The second link $9aa$ represented in FIG. 2 satisfactorily fulfils criteria a) and b). It performs very well in terms of amplitude of the relative displacement permitted in the direction X, and in terms of linearity of the force-displacement response.

On the other hand, it has a fairly high stiffness towards rotation of the mass relative to the lever about the axis $\Delta_2$.

In this context, there is therefore a need for a mechanical link which at least partly meets all the above criteria a), b) and c), and which is more flexible than the link $9aa$ of prior art with respect to rotation of the lever relative to the mass (i.e. with respect to rotation about an axis parallel to the gyrometer detection axis, that is parallel to the axis Y).

SUMMARY

To remedy at least in part the limitations of prior art, an aspect of the present technology then relates to a micro-electromechanical device comprising:

a frame, a proof mass, connected to the frame through a first mechanical link which allows pivoting of the proof mass to relative to the frame about a first axis of rotation parallel to a mean plane of the frame, and a lever for detecting pivoting of the mass, connected to the proof mass through a second mechanical link allowing rotation of the lever relative to the proof mass about a second axis, parallel to the first axis, wherein the second link comprises:

a first wall, perpendicular or virtually perpendicular to the second axis of rotation, and a second wall, in parallel or virtually in parallel to the second axis of rotation, and perpendicular to the mean plane of the frame (when the device is at rest), the first wall and the second wall connecting perpendicularly or virtually perpendicularly to each other and connecting, as regards one, to the lever and, as regards the other, to the proof mass.

The extension of the first wall, perpendicularly (or virtually perpendicularly) to the mean plane of the frame, makes this wall rigid (i.e.: stiff) along the direction Z which is perpendicular to the mean plane of the frame (in the manner of a flat ruler, the plane of which would be vertical, perpendicular to the mean plane of the frame). The same applies to the second wall, so that the first and second walls together are ultimately rigid with respect to displacements parallel to the axis Z (i.e.: able to transmit forces or displacements parallel to the axis Z, with little deformation), thus fulfilling criterion a) set forth above, in the background section.

In addition to the axis Z, the figures represent an axis X parallel to the mean plane of the frame and perpendicular to the axes of rotation. In practice, the axis X corresponds to an axis of displacement of the frame, in relation to a support for the device.

The second wall mentioned above, which is somewhat transverse, is perpendicular (or virtually perpendicular) to the axis X (in any case when the mass is at rest). It thus provides the desired flexibility and amplitude of movement along the axis X (criterion b) mentioned above), by virtue of its flexural deformation capabilities, illustrated in FIG. 7.

It also provides the second link with the desired flexibility, in terms of rotation of the mass relative to the lever about the second axis of rotation, $\Delta_2$. Indeed, as the second wall extends in parallel or virtually in parallel to the axis $\Delta_2$ (and as it is thin), it is not very rigid with respect torsional deformation about the axis $\Delta_2$, which makes it possible to fulfil criterion c) mentioned above.

In this respect, it can also be envisaged that the first wall connects to the lever while the second wall connects to the proof mass, and that the first wall is connected to the proof mass only through the second wall, so that the torsional flexibility of the second wall is not hindered by any other element. In contrast, in the link $9aa$ of prior art represented in FIG. 2, the two flexural beams $94aa$ and $95aa$, which connect the lever $7aa$ to the connecting element $91aa$, form a kind of frame, and the juxtaposition of these two beams makes the link rigid against torsion about the axis $\Delta_2$ (whereas torsional flexibility would, on the contrary, be desirable).

In addition, the first wall (ref. $91$, in FIGS. 6 and 7) limits non-linearity when the second wall $97$ is flexurally deformed. This non-linearity, reduced by virtue of the addition of the first wall, is a non-linearity of the relationship between spring force (along the direction X), and relative displacement along the axis X (relative displacement of the proof mass $4$ with respect to the lever $7$).

In fact, a link that would be made only with the second wall, used for its flexural deformability, would have a highly non-linear stiffness along X. This effect is explained with reference to FIGS. 4 and 5. FIG. 4 shows a flexible wall, rigidly connected (embedded) at both ends to two elements movable relative to each other. When one of these elements is offset by an amount $\delta X$ relative to the other element (offset along the axis X), the wall deforms (FIG. 5). To avoid increasing the length of the neutral axis of the wall, the two ends of the wall then move slightly closer to each other, in the direction Y (perpendicular to X), by an amount $\delta Y$. Thus, in such a situation, the relative displacement $\delta X$ between the two ends of the flexural wall is accompanied by a slight displacement $\delta Y$ along the axis Y. When this displacement $\delta Y$ is prevented, that is when it is restricted to 0 by the structure of the rest of the device, there is strong resistance to large amplitude displacements $\delta X$ (since, for these displacements, the wall has to be stretched, that is made to work in extension, whereas it is very stiff with respect to extension deformation). However, the displacement $\delta Y$ varies non-linearly as a function of $\delta X$. When the displacement $\delta Y$ is prevented, the additional, strong stiffness due to the stretching of the neutral axis also non-linearly varies as a function of $\delta X$. According to the axis X, the total spring force therefore finally has a significant non-linear component, which varies non-linearly as a function of the displacement $\delta X$.

In the second link in accordance with the present technology (FIGS. 6 and 7), instead of connecting directly to the lever (or, respectively, to the proof mass), the second wall $97$ is connected to the lever via the first wall 91 (FIG. 6). As the first wall can be easily flexurally deformed (i.e. with low stiffness), the end 98 of the second wall 97 can move virtually freely along the axis Y (FIG. 7). The displacement δY between the two ends 98 and 99 of the second wall 97, mentioned above, as a result of a displacement δX along the axis X, and non-linear with respect to the latter, biases the very low flexural stiffness of the first wall 91. The total X stiffness is therefore dominated by the flexural stiffness of the second wall 97, biased by the high displacement δX, which makes it possible to significantly reduce the non-linearity mentioned above.

Correcting the non-linearity in question as far as possible is very useful in practice, as the amplitude of displacement of the proof mass relative to the lever is very large (several microns, or even several tens of microns) and would therefore lead to large amplitude non-linear effects, in the absence of correction.

It should also be noted in this respect that, in the link 9*aa* of prior art, the link between lever and proof mass is made by means of the connecting element 91*aa* which forms a kind of movable island and which, by virtue of its displacement possibilities, allows the displacement δY mentioned above, and thus enables the non-linearity in question to be corrected very effectively (the beams 92*aa*, 93*aa*, 94*aa* and 95*aa* having the same geometry and being subject to the same stresses, they all deform by δY).

In the device in accordance with the present technology, the linearity of the relationship between spring force and displacement along the axis X can be further improved by connecting one or even both ends 92, 93 of the first wall 91, to the lever (or, optionally, to the proof mass), via a relatively short connecting wall 94, 95 (shorter than the second wall), and parallel to the second wall 97. The flexural deformability of this connecting wall 94, 95 then allows the two ends 92, 93 of the first wall 91 to move towards each other when the first wall 91 is flexurally deformed (FIG. 7), thus limiting a non-linearity associated this time with the stretching along X (non-linear in δY) of the neutral axis of the wall 91. Furthermore, as these connecting walls 94, 95 are short, the link retains good out-of-plane rigidity. It will be noticed that by introducing the connecting walls 94 and 95, the basic principle set forth above is again used, according to which, at the end (or at both ends) of a wall used in flexion (this time wall 91, instead of 97), another wall (this time 94 or 95, instead of 91), perpendicular or virtually perpendicular to the wall (the beam) used for flexion (91), to allow the end (92, 93) of the flexural wall (91) to move substantially parallel to this wall, in order to limit stretching of its neutral axis. The introduction of these connecting walls 94, 95 therefore corresponds to a progressive, recursive reduction in non-linearities, in which the basic principle in question is used several times in succession (in this case twice in succession). During the iterative application of this basic principle, after stage 1, that is after the first wall 91, increasingly shorter walls (beams) are desirably used so as not to alter the out-of-plane stiffness too much, and because the displacement to be absorbed (displacement substantially parallel to the flexural beam in question) is increasingly small. In the event that the connecting walls 94, 95 are added in addition to the first wall 91, this basic principle is iterated twice (once with the first wall 91, and another time with the connecting walls 94 and 95). But it could be iterated more than twice. In practice, two iterations prove to be a good compromise between performance of the link on the one hand, and ease of manufacture on the other hand.

The performance of the second link with respect to the criteria a), b) and c) listed above, and the improvement that this link brings compared with prior art, are illustrated below, in the description, by (numerical) examples obtained by numerical simulation.

In this document, by link, it is meant an element, or a set of elements guiding the movement of the proof mass in relation to the frame (i.e.: arranged to hinge the mass with the frame), or guiding the movement of the proof mass in relation to the lever (or the movement of the frame, or of the lever in relation to the support of the device).

By wall, it is meant an element delimited by two free surfaces substantially parallel to each other (parallel to better than 15 degrees) and separated by a distance smaller, and even significantly smaller, than the dimensions of these free surfaces. Stated differently, it is an element (not necessarily planar) whose surface area is significantly greater than the distance between the two free surfaces of the wall (i.e. significantly greater than the area of the element along a direction transverse to the wall).

In this document, for both the first wall and the second wall, the term "thickness" refers to the extension of the wall along the direction Z perpendicular to the layers (perpendicular to the substrate). It is thus in a way the height of the wall. The term "width" refers to the extension of the wall perpendicularly to the free surfaces of the wall ("vertical" free surfaces, parallel to Z).

Furthermore, in this document, by "virtually parallel" and "virtually perpendicular", it is meant parallel, or respectively perpendicular, to better than 15 degrees, or even to better than 5 degrees or even 1 degree.

Further to the characteristics mentioned above, the device just set forth may include one or more of the following optional characteristics, considered individually or according to any technically contemplatable combinations:

the second link is configured so that, at the second link, the mass drives the lever therewith along a direction of out-of-plane movement, perpendicular to the mean plane of the frame, when the mass pivots about the first axis of rotation;

the lever is rotatably movable (relative to the support of the device) about a detection axis parallel to the first axis of rotation;

the first wall and the second wall connect together to form a T, the second wall corresponding to the vertical median bar of the T;

the first wall extends:
from a first end, connected to the lever,
to a second end, also connected to the lever;

the second wall extends:
from a first end, through which the second wall connects to the first wall, in a median zone of the first wall, between the first and second ends of the first wall,
to a second end through which the second wall connects to the proof mass;

the first end of the first wall connects to the lever via a connecting wall, which extends from this first end to the lever, in parallel to the second wall;

the second end of the first wall connects to the lever via another connecting wall which extends from this second end to the lever, in parallel to the second wall;

the first wall connects to the lever while the second wall connects to the proof mass, and the first wall connects to the proof mass only through the second wall.

the only direct link between the proof mass and the lever (direct, that is without passing through another element of the device, such as the frame) is the second connection;

the second link further comprises:

a first additional wall, perpendicular to the second of rotation, and a second additional wall, parallel to the second axis of rotation, the first additional wall and the second additional wall connect perpendicularly to each other and connecting, as regards one, to the lever and, as regards the other, to the proof mass, the second wall and the second additional wall being located as an extension of each other;

the second wall and the second additional wall are aligned with each other;

the second wall and the second additional wall each extend along the second axis of rotation;

the first wall has, along a direction parallel to the lever, a length greater than twenty times a width that the first wall has along a direction perpendicular to the lever, or even greater than forty times its width or even greater than eighty times its width;

along a direction perpendicular to the mean plane of the frame, the first wall extends over a thickness greater than four times its width or even greater than ten times its width;

the second wall has, in parallel to the second axis of rotation, a length greater than twenty times a width that the second wall has along a direction perpendicular to the second axis of rotation, or even greater than forty times its width;

along a direction perpendicular to the mean plane of the frame, the second wall extends over a thickness greater than four times its width, or even greater than ten times its width;

the device is of the gyrometer type;

the frame and the proof mass are called the first frame and the first proof mass respectively, and the device further comprises:

a second frame, a second proof mass, connected to the second frame through a first additional link which allows the second proof mass to pivot relative to the second frame about a first additional axis of rotation, parallel to the first axis of rotation, and the second proof mass is also connected to the detection lever, through a second additional link allowing rotation of the lever relative to the second proof mass about a second additional axis of rotation, parallel to the first axis of rotation, the lever being connected to the first proof mass on one side and to the second proof mass on the other side;

the detection axis is fixed with respect to this support;

the second link, and the second additional link connecting the detection lever to the second proof mass, are located opposite to each other with respect to the detection axis;

the device further comprises a support, and both the first frame and the second frame are translationally guided relative to the support along an axis of displacement which is parallel to a mean plane of the frame and which is perpendicular to the first axis of rotation;

the device further comprises an electromechanical actuation system configured to impose oscillation to each of the frames along the axis of displacement, the displacement of the first frame relative to the support and the displacement of the second frame relative to the support having a same amplitude and opposite directions to each other.

The present technology and its different applications will be better understood upon reading the following description and upon examining the accompanying figures.

BRIEF DESCRIPTION OF THE FIGURES

The figures are set forth by way of indicating and in no way limiting purposes.

FIG. 3 schematically represents the link of FIG. 2, in a situation where the proof mass has moved along the axis X with respect to its rest position.

FIG. 4 schematically represents a flexible wall connecting two elements, in a top view.

FIG. 5 schematically represents how the wall in FIG. 4 purely flexurally deforms.

DETAILED DESCRIPTION

Figure 8:
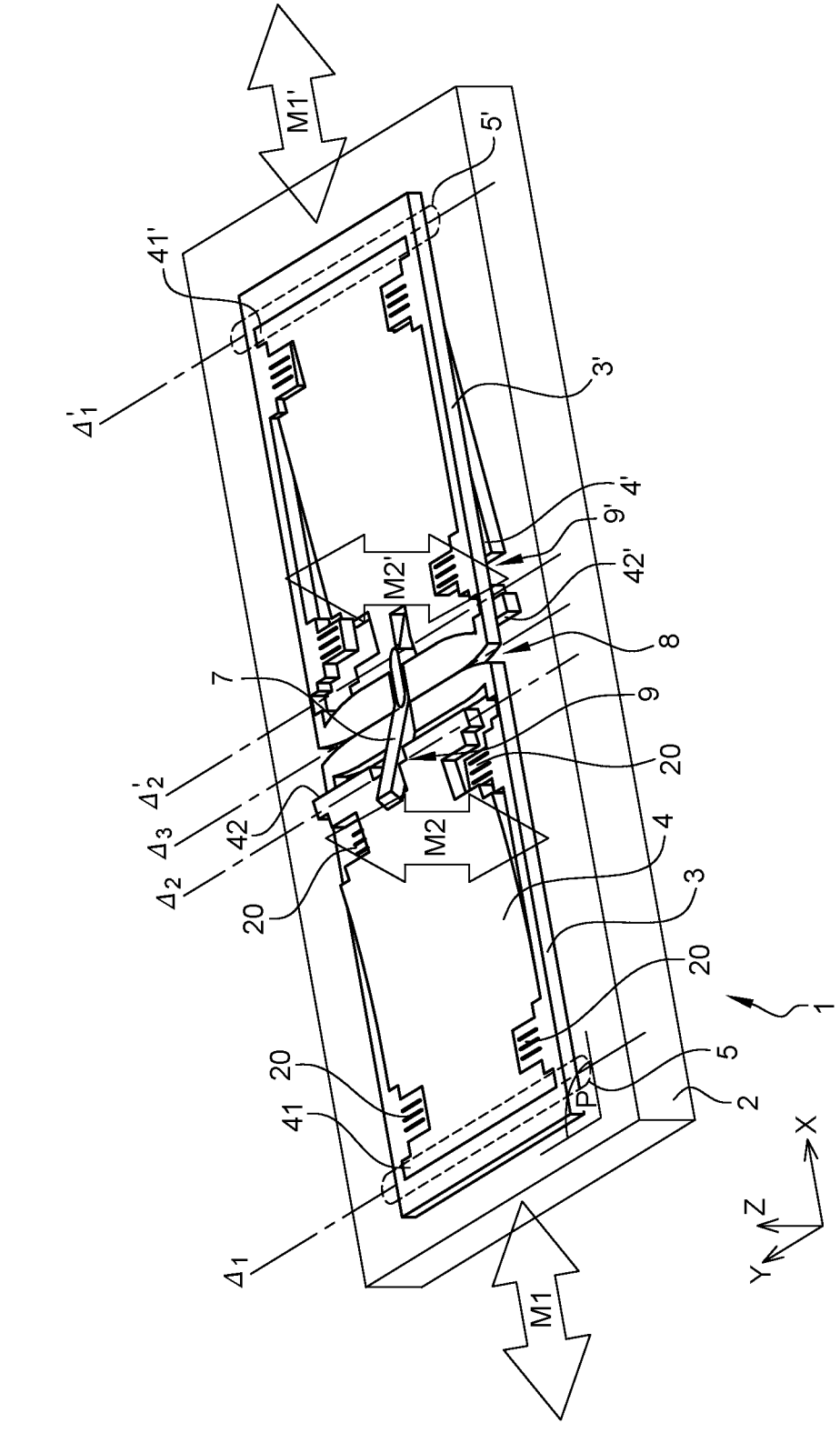
FIG. 8 is a schematic perspective representation of a gyrometer with two movable frames implementing the present technology.
Figure 9:
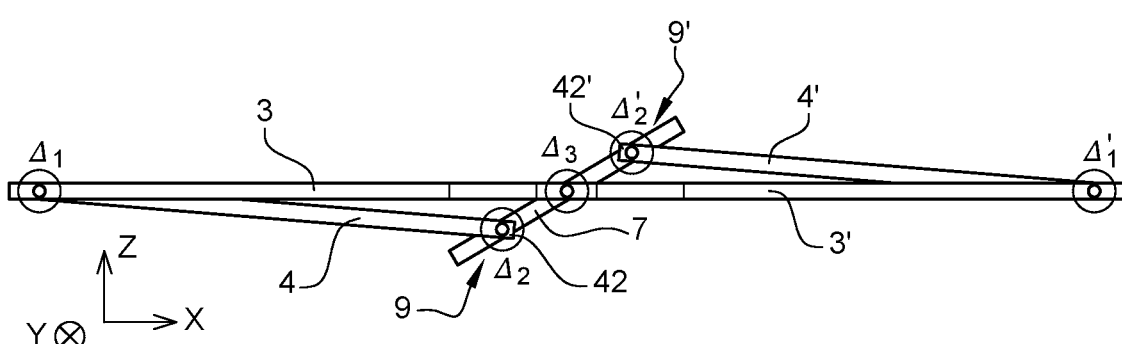
FIG. 9 schematically represents part of the gyrometer of FIG. 8, in a side view.
Figure 10:
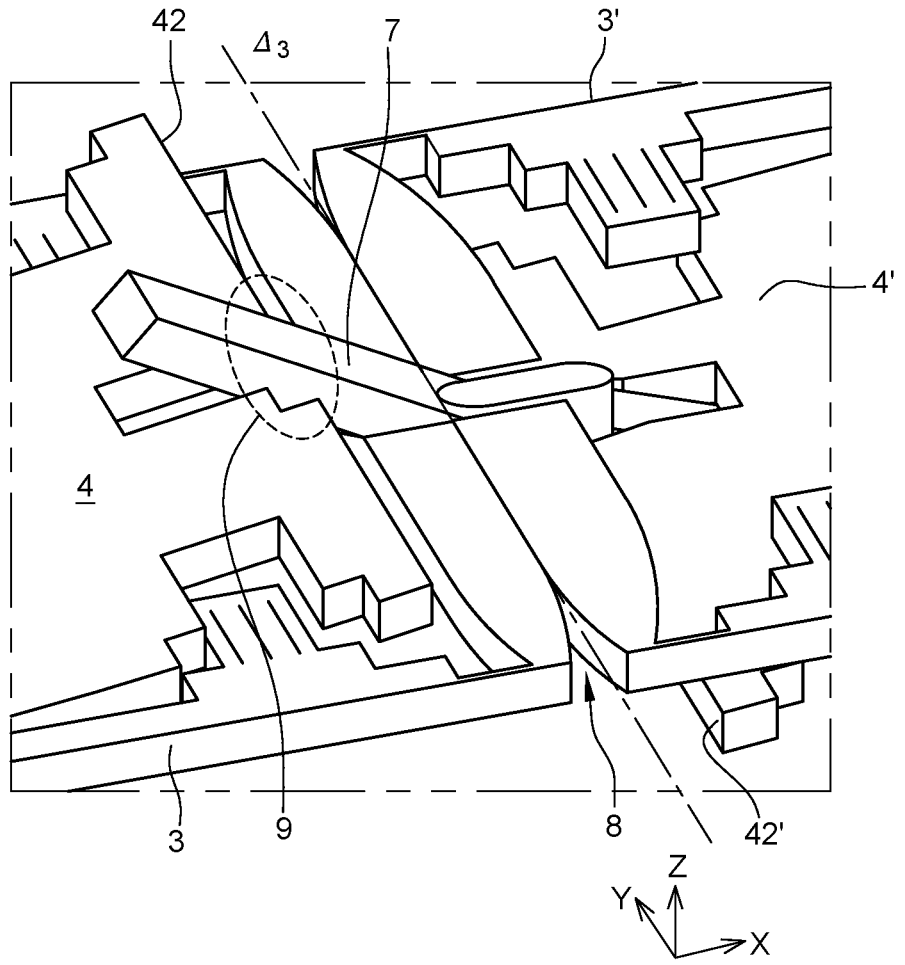
FIG. 10 is a detail perspective view of a central zone of the gyrometer of FIG. 8.

FIGS. 8, 9 and 10 show a gyrometer-type device 1 implementing the present technology. This gyrometer 1 is a double-frame gyrometer with out-of-plane movement, which makes it possible to measure a speed of rotation about an axis Y parallel to the mean plane of the substrate from which the gyrometer 1 is made.

Most of this substrate forms a thick layer that serves as a support 2.

The gyrometer 1 comprises two movable frames 3 and 3', each guided for displacement, relative to this support 2, along an axis X which is parallel to the mean plane of the support. Each frame 3; 3' is parallel to the support 2. Stated differently, for each frame 3, 3', the mean plane P of the frame is parallel to the mean plane of the support 2. In the following, the orientation of different axes and walls are referred to the mean plane P of the frame 3, 3', or, indifferently, to the mean plane of the support 2 (since these two mean planes are parallel to each other).

The axis of displacement of the frames, X, is perpendicular to the axis of measurement of the angular speed of rotation, Y. The axis of displacement of the frames, X, and the axis of measurement of the angular speed, Y, are shown in the different figures, as is an axis Z, perpendicular to the mean plane of the support (perpendicular to X and Y).

For each frame, guidance of the frame relative to the support is achieved by virtue of four springs 20, for example, disposed at four points of the frame remote from each other, each spring 20 connecting the frame to the support and allowing relative movement parallel to the axis X. In this case, the springs 20 comprise leaves working in flexion, which connect the support 2 to the frame 3, 3' considered. The frames 3 and 3' herein have an overall rectangular shape.

During operation of the gyrometer, the two frames are moved, for example by electrostatic actuation using inter-digital combs (not represented), so that they oscillate in parallel to the axis X, in phase opposition to each other (symmetrically). The two frames then have the same speed, but their directions of movement, relative to the support 2, are opposite to each other.

The two frames 3 and 3' are arranged opposite to each other, on either side of a fixed central portion 8 (i.e. without movement relative to the support 2) of the gyrometer. In FIGS. 8 and 10, the detail of this central portion 8 is not represented, for the sake of clarity of the figure. Stated differently, FIGS. 8 and 10 are partial views. The boundary between non-represented parts and represented parts is marked on each of these figures by three thick, wavy lines.

Each frame 3, 3' drives a proof mass 4, 4' (also known as a Coriolis mass) therewith, which is connected to the frame through a first link 5, 5' which allows pivoting of the proof mass to about a first axis of rotation $\Delta_1$, $\Delta'_1$ parallel to the axis Y. This link partly resembles a pivot link or, stated differently, a hinge. The first link 5, 5' is rigid with respect to relative displacements between the mass and the frame along the axis X (whereas the second links 9, 9' shown below are instead flexible along the axis X). As a result of this strong coupling, for the oscillating movement of each mass—frame assembly, relative to the support, in parallel to the axis X, virtually a single resonance frequency is obtained, typically between 1 and 100 kHz (or even between 5 and 50 kHz).

As can be seen in FIG. 8, each proof mass 4, 4' here has an overall shape which is that of a plate (approximately parallelepipedal), parallel to the mean plane P of the frame 3, 3' when the mass is at rest. This plate is surrounded by the corresponding frame over most of its perimeter. Each mass 4, 4' extends from a first end 41, 41' to a second end 42, 42'. The mean axis of the proof mass 4, 4', which connects its first end to its second end, is parallel to the axis of displacement, X.

The first end 41, 41' is connected to the frame 3, 3' through the first link 5, 5 mentioned above, while the second end 42, 42' of the mass can move "out of plane", along a direction parallel to the axis Z, when the mass 4, 4' pivots about its axis of rotation $\Delta_1$, $\Delta'_1$.

For each mass 4, 4', the first end 41, 41' is located, relative to the rest of the proof mass 4, 4', opposite to the other proof mass 4', 4 (and therefore opposite to the other frame 3'). Stated differently, each proof mass 4, 4' is instead connected to its frame 3, 3' (through the first link 5, 5') on the somewhat outer side of the frame, on a side of this mass opposite to the other proof mass 4', 4.

Each proof mass 4, 4' is connected, on the side of its second end 42, 42', to a common rotation detection lever, 7, through a mechanical link 9, 9'. This lever 7 pivots about a detection axis $\Delta_3$, which is parallel to the axis Y and which is fixed (or at least essentially fixed) with respect to the support 2. The lever 7 is here connected to the support 2 through a link acting as a hinge (translationally stiff along X and Z, and relatively flexible with respect to rotation about the detection axis $\Delta_3$). Lever 7 is located in the central zone of the gyrometer, between the two proof masses. Lever 7 has the shape of a beam, centred on the mean axis of the gyrometer (the mean axis which is parallel to X), when the gyrometer is at rest.

When the gyrometer 1 rotates (i.e.: when the support 2 rotates) with respect to an inertial reference frame, for example with respect to the Galilean reference frame, about the axis Y, with an angular velocity $\vec{\Omega} = \Omega\vec{y}$, each mass 4, 4' then experiences a Coriolis force, which is expressed as $\vec{F}_{cor} = 2\,m_{cor}(v\,\vec{x}) \supseteq (\Omega\hat{y})$ where $m_{cor}$ represents the mass of any one of the proof masses 4, 4' and where v is its speed of displacement (along the axis X). This force is therefore directed along the axis Z and is of the same amplitude but in the opposite direction for the two proof masses 4 and 4' (since the two masses are driven in opposite directions). For each of these two masses, this force therefore causes a displacement of its second end 42, 42', along the axis Z (or, stated differently, a pivoting of the mass about the first axis of rotation $\Delta_1$, $\Delta'_1$), in an opposite direction for the two masses 4, 4', which then causes the detection lever 7 to rotate about the detection axis $\Delta_3$ (see FIG. 9). This rotation of the lever is measured, here by virtue of piezoresistive strain gauges 21, 22 (FIGS. 11 and 12), to deduce the angular velocity $\Omega$ thereof. In FIGS. 8 to 10, the amplitude of displacement along the axis Z is exaggerated (i.e. this displacement is not represented to scale), to make it clearly visible. In practice, the amplitude of oscillation of the frames, along the axis X, is in the order of about ten microns (which is very high, for a MEMS), while the displacement, along the axis Z, of the second ends of the masses is, for example, in the order of 0.1 micron. In these figures, the displacement of the frames and masses along the axis X is schematically represented by the double arrows M1 and M1', while the displacement along the axis Z of the second ends of the masses is depicted by the double arrows M2 and M2'.

Each first link 5, 5' has some stiffness, opposing to rotation of the corresponding proof mass 4, 4' about the first axis of rotation $\Delta_1$, or $\Delta'_1$. To this rotational stiffness are added:

stiffness of the strain gauges, stiffness of the hinge which connects lever 7 to support 2, and rotational stiffness of the second link 9, 9', which connects the mass 4, 4' and the lever 7.

The rotational movement of the mass 4, 4' about its axis of rotation $\Delta_1$, $\Delta'_1$ is associated with a resonance frequency, chosen for example so as to be close to (slightly higher, for example by 1 to 10%) the resonance frequency of the frame-mass assembly in its oscillation in parallel to X (frequency at which the system is excited to obtain large displacements). This results in a larger angular velocity measurement signal Q.

In any case, the overall architecture of the gyrometer, with two proof masses 4 and 4' oscillating symmetrically and actuating the same rotation detection lever 7, is particularly interesting because it allows differential detection of the angular speed of rotation $\Omega$, which greatly improves the signal-to-noise ratio of this gyrometer 1 while greatly attenuating effect of vibrations on the movable parts.

Figure 11:
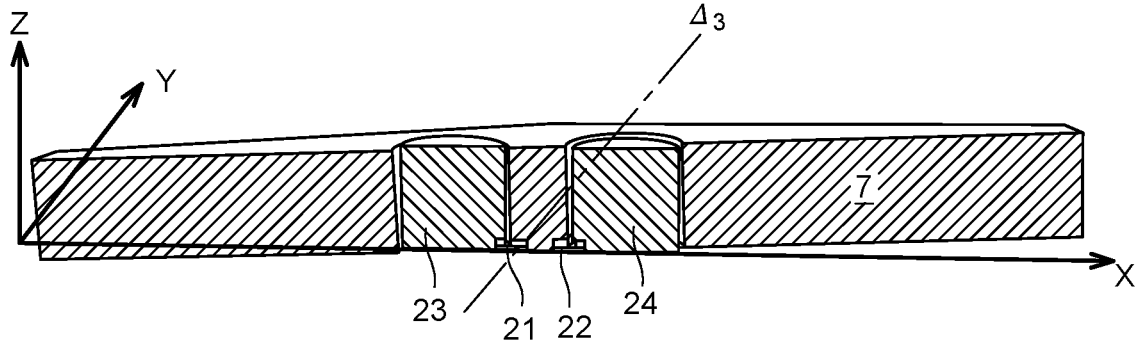
FIG. 11 schematically represents a cross-section side view of a detection lever and strain gauges of the gyrometer of FIG. 8.
Figure 12:
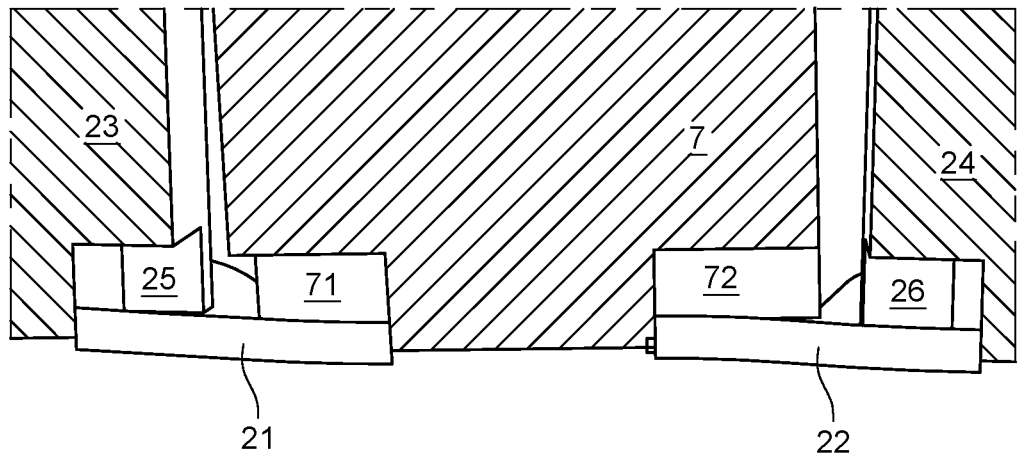
FIG. 12 is a detail cross-sectional and side view of these strain gauges.

FIGS. 11 and 12 show how the gauges 21 and 22 are arranged. Each of these gauges 21, 22 is connected, on one side to the lever 7, and on the other side to a gauge anchoring stud, 23, 24. Each anchoring stud is integral with the support 2. Here, the anchoring studs are at least partly housed in openings or housings provided in the lever 7, with sufficient spacing between the studs and the lever to allow the lever to pivot about the detection axis $\Delta_3$. The two anchoring studs are located on either side of the detection axis $\Delta_3$.

The two strain gauges 21, 22 are located in the lower part of the lever. They extend from a lower face of the lever (lower face which is the face of the lever on the side of the support).

The strain gauges 21, 22 may, as here, each be formed by a portion of a thin silicon top layer of an SOI, silicon-on-insulator, substrate from which the gyrometer is manufactured.

Such an SOI substrate comprises a thick support layer (generally at least 100 microns thick, generally more), covered with an insulating layer, generally of silicon oxide, itself covered by the thin silicon top layer, often called the Si-top layer. This Si-top layer, when manufactured, has a reduced $t_{NEMS}$ thickness (for example 250 nm) and is very well controlled. It is also essentially monocrystalline, and therefore suitable for producing the piezoresistive gauges 21, 22. During manufacture of the gyrometer, an additional layer of silicon (or possibly another material), which is fairly thick (thickness $h=t_{MEMS}-t_{NEMS}$), is deposited on the Si-top layer, to form the bulk of the proof masses and frames (total thickness $t_{MEMS}$). This additional layer is polycrystalline or monocrystalline, and its thickness h is typically a few microns or tens of microns. During manufacture of the gyrometer, the Si-top layer and this additional layer are etched to define the different elements of the gyrometer. The silicon oxide layer mentioned above, located under the Si-top layer, is removed (by chemical etching) especially under the parts of the gyrometer that are movable in relation to the support (frames and proof mass in particular), to release these movable parts. Once manufactured, the thick support layer of the SOI substrate forms the support 2 of the gyrometer. In such a device, the Si-top layer, or the elements derived from this layer, are sometimes referred to as the NEMS (nano-electromechanical system) layer.

The two strain gauges 21, 22 are located on either side of the detection axis 3. In addition, the detection axis $\Delta_3$ is offset with respect to the strain gages (due to the positioning and configuration of the hinge mentioned above, which connects lever 7 to support 2), in that it is not located as an extension of the strain gages (in practice, the axis $\Delta_3$ is located at a different z coordinate from those of the strain gages). Thus, when the lever is rotated about this axis, one of the gauges is stretched, while the other is compressed, which contributes to the differential nature of the angular velocity measurement. In FIGS. 11 and 12, lever 7 is represented in a position which is slightly tilted (about the axis $\Delta_3$) with respect to the reference position which it occupies when the angular velocity $\Omega$ is zero. In the situation represented, strain gauge 22 is compressed while strain gauge 21 is stretched (FIG. 12).

Here, each strain gauge takes the form of a beam or membrane extending parallel to the axis X.

Clearances 25, 26, 71 and 72 are provided, both in the anchoring studs and in the lever, around the zone occupied by each strain gauge 21, 22 (this results from the way the gauges are manufactured, and enables the gauges to be clearly delimited).

The second links 9 and 9', which connect lever 7 to proof mass 4 and proof mass 4' respectively, are now set forth in more detail.

Figure 13:
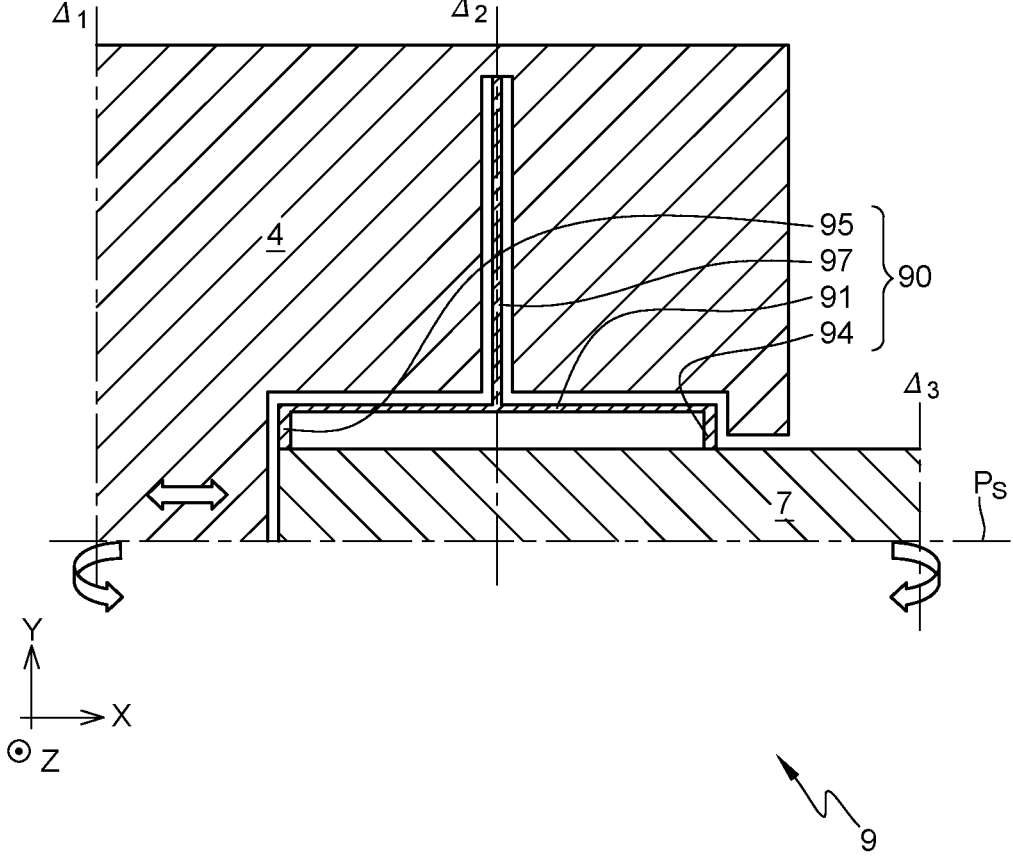
FIG. 13 schematically represents a first embodiment of a mechanical link which, in the gyrometer of FIG. 8, connects one of the proof masses to the detection lever, in a top view.
Figure 14:
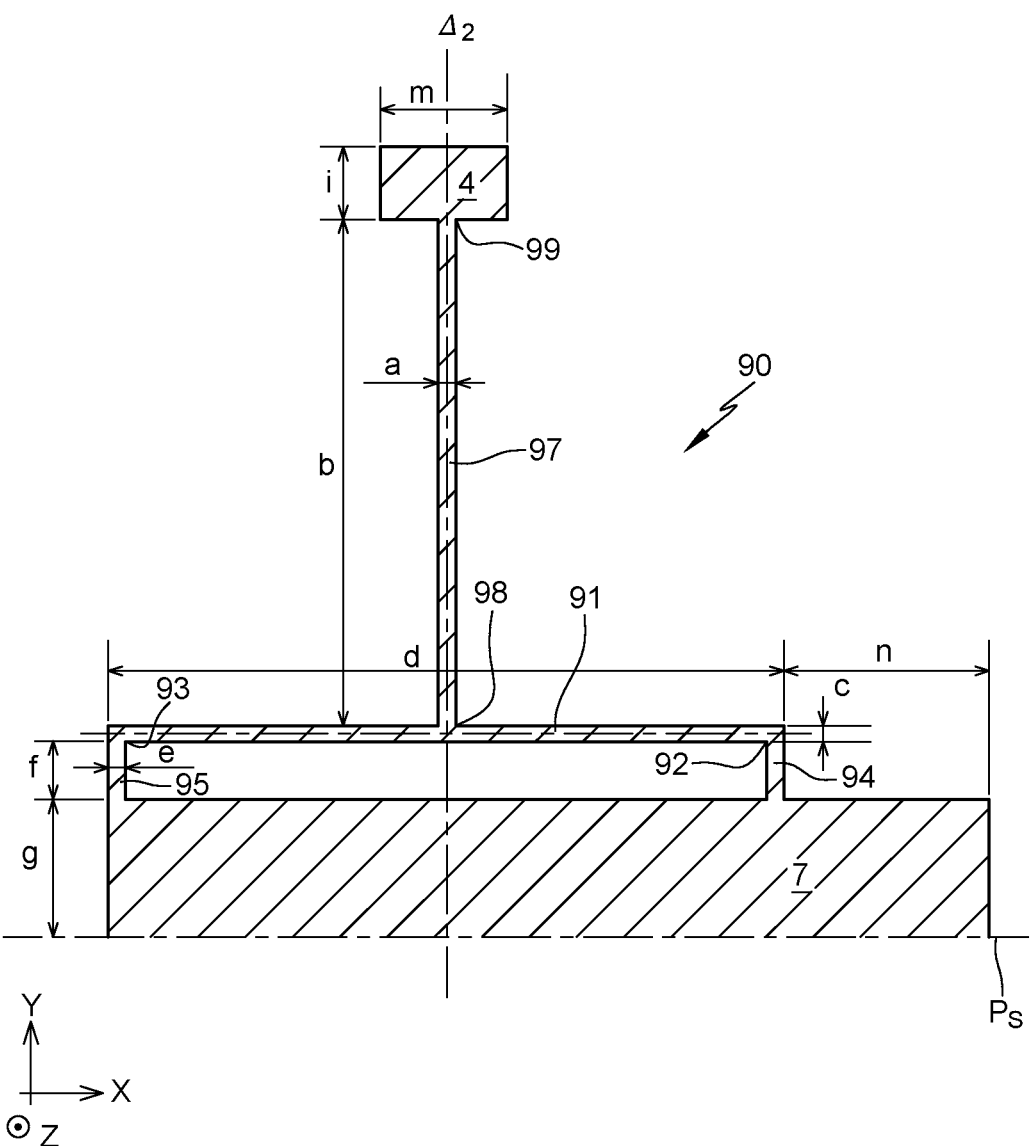
FIG. 14 again represents the first embodiment of this link, in a partial top view.

Here, these two links are identical. Therefore, only one of these two links, 9, will be described in detail here. This link 9, as represented in FIGS. 13 and 14, corresponds to a first contemplatable embodiment for the link between the lever and the proof mass considered. A second, third and fourth embodiment of such a connection, well adapted to connect the lever 7 to the proof mass 4, are represented respectively in FIGS. 15, 16 and 17, and are marked respectively by the references 19, 29 and 39. The link 19; 29; 39 according to any one of these three embodiments could thus replace the link 9, 9' in the gyrometer 1 of FIG. 8.

From one embodiment to the next, identical (or, at least, corresponding) elements are marked by the same reference as far as possible.

In these four embodiments, the second link 9; 19; 29; 39 comprises two half-links, located respectively on one side and the other side of lever 7, on either side of a plane of symmetry of the link, Ps (plane of symmetry which is perpendicular to axis Y). Here, the plane of symmetry PS is also a plane of symmetry for the mass-lever assembly. The two half-links in question are facing each other. They are symmetrical to each other with respect to the plane of symmetry PS. FIG. 13 shows the two half-links, 90 and 90s, which together form the link 9 in the first embodiment. FIGS. 14 to 17 then show, for each of these four embodiments, one of the two half-links forming the link in question, 9; 19; 29; 39 (the other half-link being symmetrical).

In these four embodiments, the half-link in question comprises:

a first wall 91; 391, perpendicular to a second axis of rotation $\Delta_2$, and a second wall 97, perpendicular to the mean plane P of the frame 3 (strictly speaking, perpendicular to the mean plane of the frame when the mass is in its rest position), and parallel to the second axis of rotation $\Delta_2$, the first wall 91; 391 and the second wall 97 connecting perpendicularly to each other and connecting, as regards one, to the lever 7 and, as regards the other, to the proof mass 4.

The second axis of rotation $\Delta_2$, which is the axis of rotation of the second link, is parallel to the first axis of rotation $\Delta_1$. When the frames 3, 3' oscillate, the positions of the first axes of rotation $\Delta_1$, $\Delta'_1$ vary (these axes are translated), as the frames move relative to the support 2. It should be noted that the X position of the second axes of rotation $\Delta_2$, $\Delta'_2$ does not necessarily vary by the same amount as the X position of the first axes $\Delta_1$, $\Delta'_1$.

As explained in detail in the "summary" section, by virtue of this particular arrangement, the second link 9; 19; 29; 39:

a) is able to transmit a force in parallel to the axis Z, with little deformation in this direction (i.e.: high stiffness of the link along the axis Z, by virtue of the significant $t_{MEMS}$ extension of the walls 91; 391 and 97 along the axis Z); this enables the proof mass 4 to drive the lever 7 therewith along a direction parallel to the axis Z, effectively, when the proof mass pivots;

b) allows a large relative displacement of the mass 4 with respect to the lever 7, along the direction X, with a low stiffness with respect to this displacement (by virtue of the flexural deformation possibilities of the second wall 97), and with a low non-linearity (by virtue of the addition of the first wall 91; 391 which allows displacements along Y of the end 98 of the second wall 97, at the junction between these two walls), and c) has a low rotational stiffness with respect to a rotation of the lever 7 relative to the mass 4, about the axis of the link, which is the second axis of rotation $\Delta_2$ (by virtue of the possibility of torsional deformation of the second wall 97 about this axis).

Figure 15:
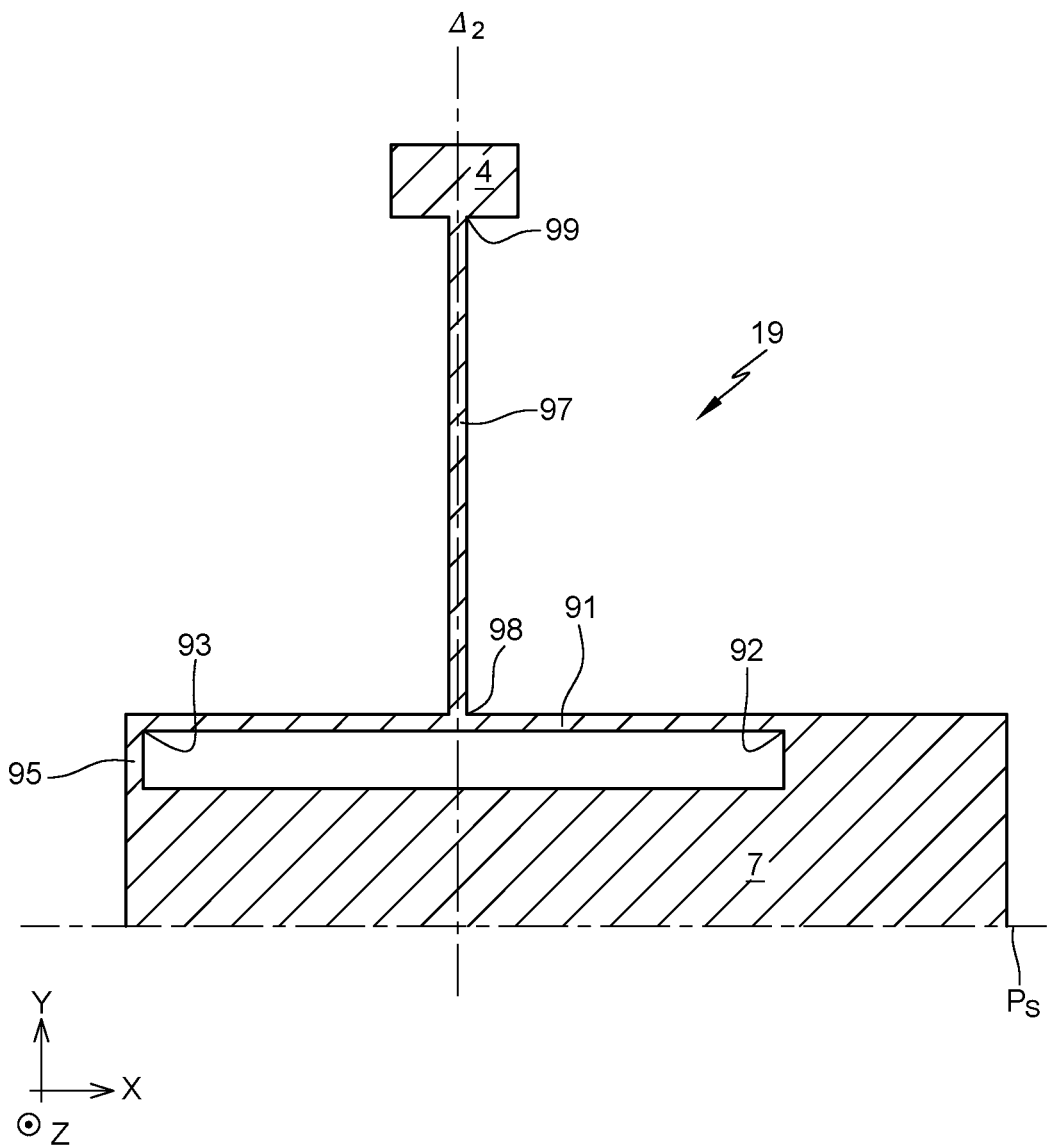
FIG. 15 schematically and partially represents a second embodiment of the mechanical link in question, in a top view.
Figure 16:
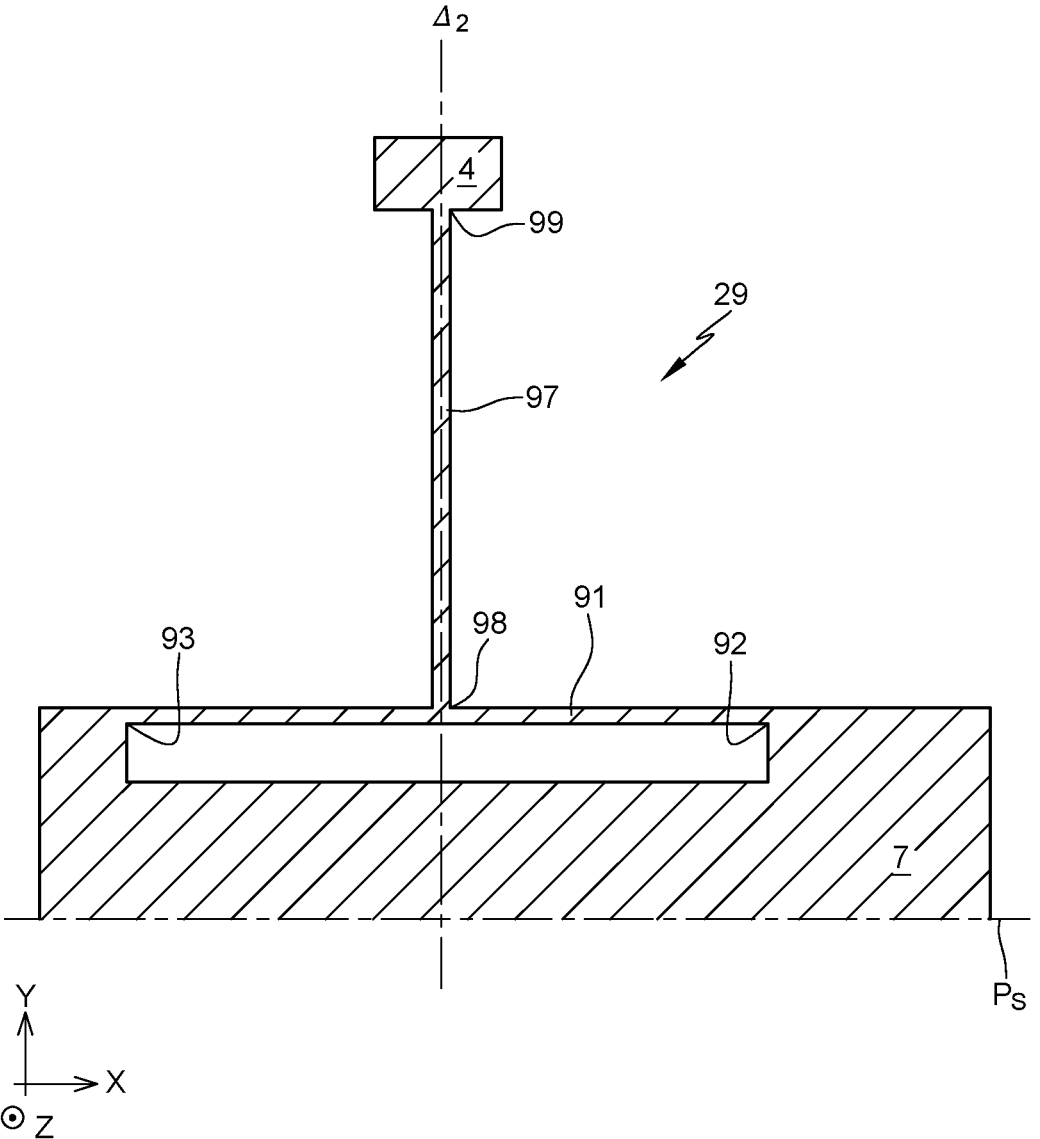
FIG. 16 schematically and partially represents a third embodiment of the mechanical link in question, in a top view.
Figure 17:
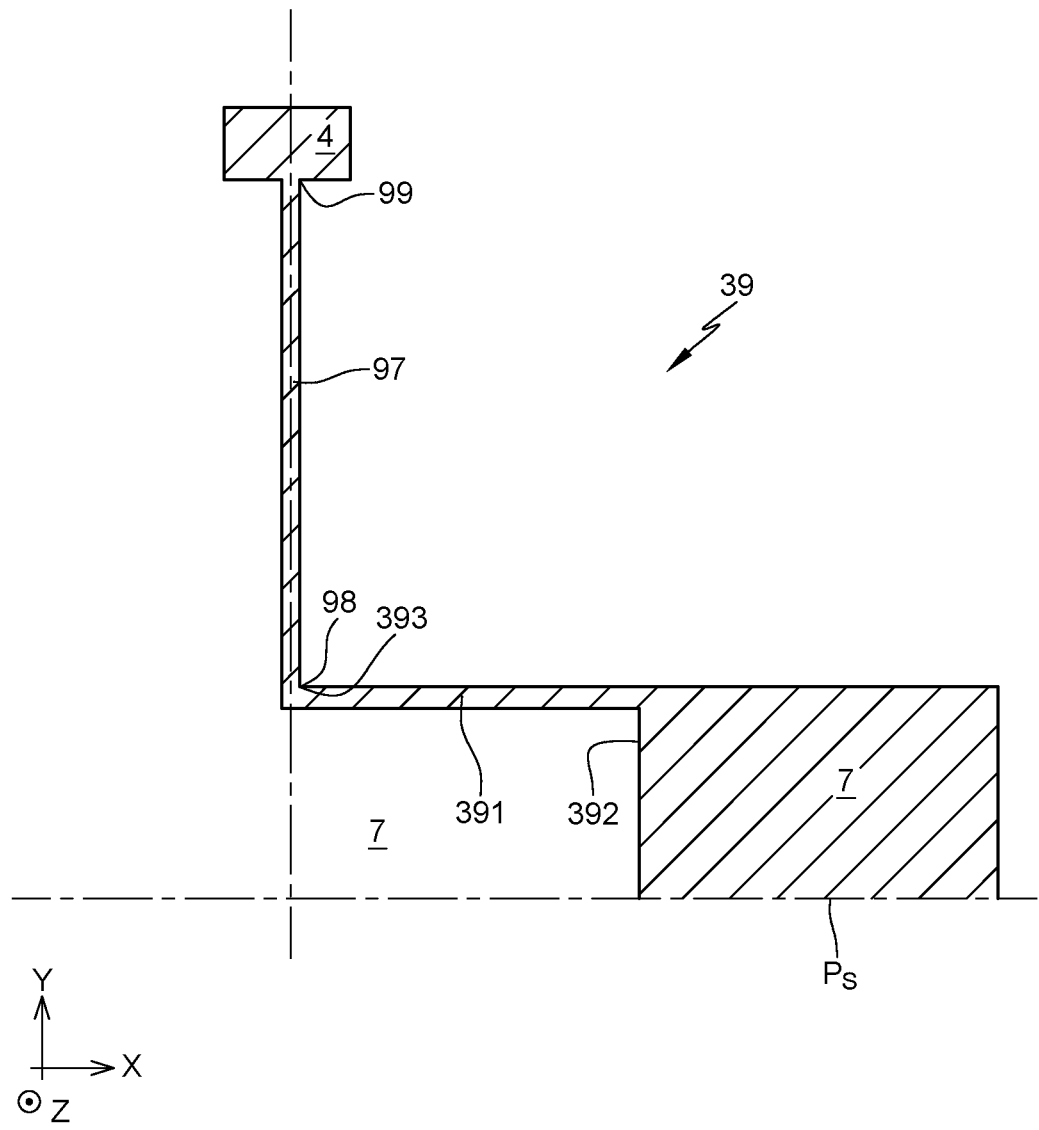
FIG. 17 schematically and partially represents a fourth embodiment of the mechanical link in question, in a top view.

In the exemplary embodiments represented, the first wall 91; 391 connects (directly, or via one or two connecting walls 94, 95) to the lever 7, while the second wall 97 connects (directly) to the proof mass 4, the first and second walls also connecting to each other at right angles, for example forming an (inverted) T, as in FIGS. 13 to 16, or forming an L (FIG. 17). Alternatively, the first wall could connect to the proof mass while the second wall connects to the lever (stated differently, for the different embodiments set forth here, the configuration of each half-link could be reversed).

Figure 1:
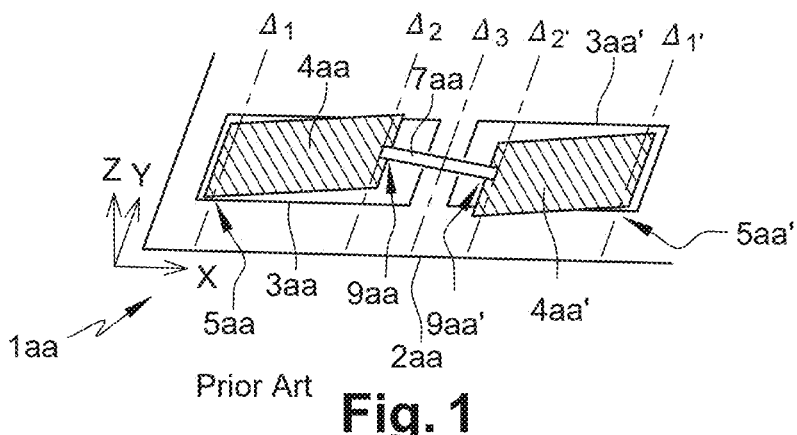
FIG. 1 schematically represents a gyrometer with two movable frames.
Figure 2:
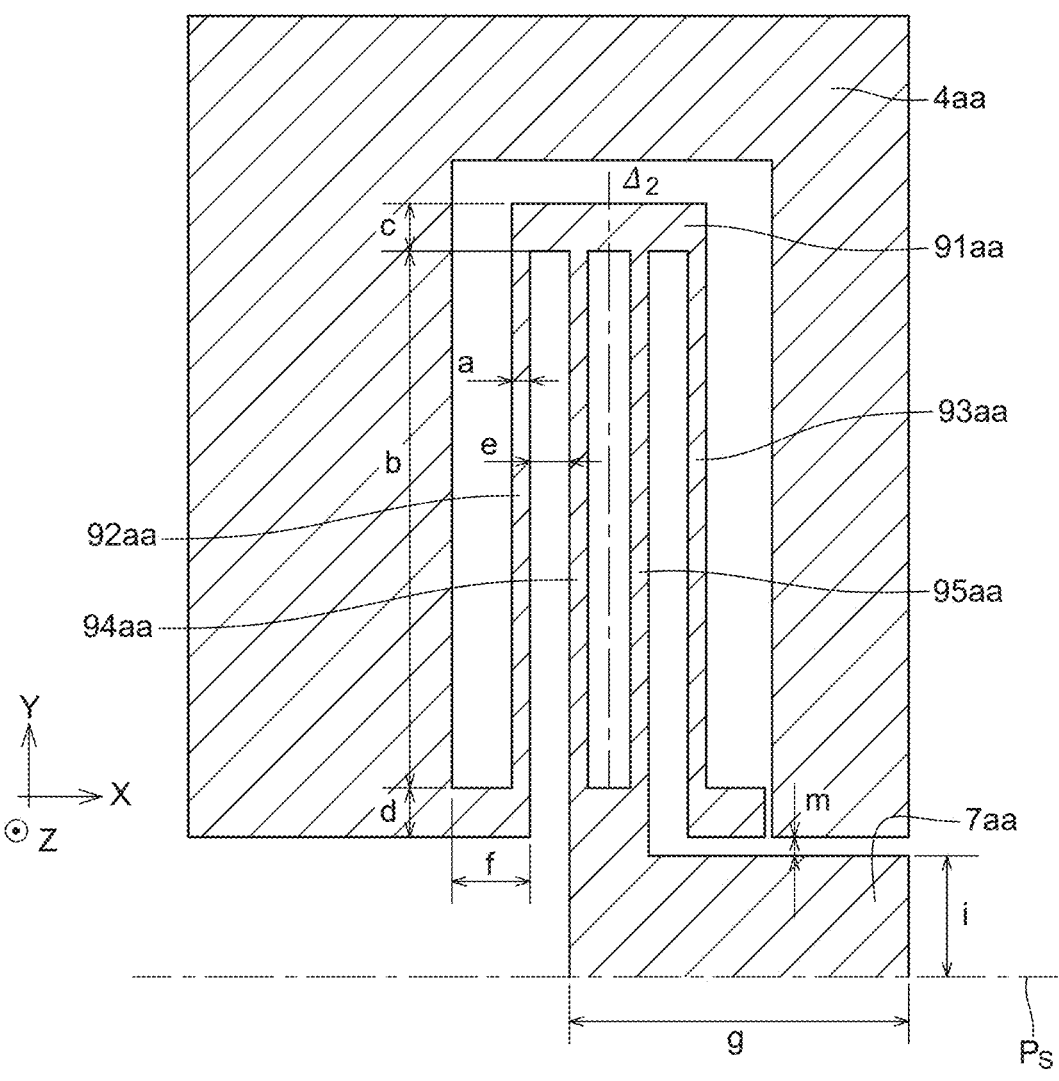
FIG. 2 is a top partial schematic view of a mechanical link of the gyrometer of FIG. 1, this link connecting one of the proof masses of the gyrometer to a detection lever.
Figure 6:
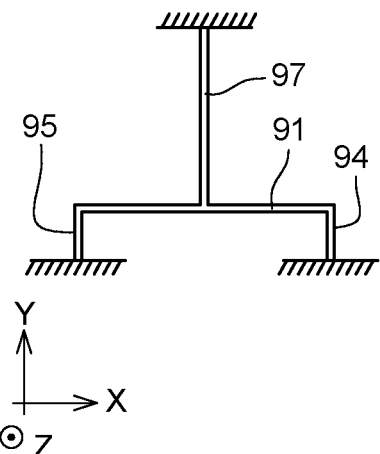
FIG. 6 is a representation of the principle of a link implementing the present technology, this link connecting the proof mass of a micro-electromechanical device to a lever for detecting pivoting of this mass.
Figure 7:
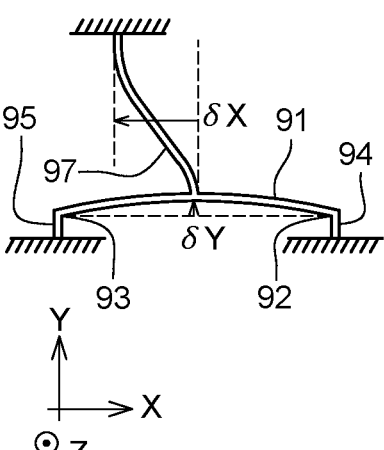
FIG. 7 schematically represents the link of FIG. 6, in a situation where the proof mass has moved relative to its rest position, along an axis of displacement X.

In any case, here, the first wall 91; 391 is connected to the proof mass only through the second wall 97 in question (and not by several flexible walls located side by side, as is the case in the link 9$aa$ of prior art set forth above with reference to FIG. 2), which contributes to the flexibility of the link in terms of rotation about the second axis $\Delta_2$.

More generally, the only mechanical link which directly connects the second end 42 of the proof mass 4 to the lever 7 (that is which connects them without passing through another element, such as the frame 3) is the second link 9; 19; 29; 39 in question. And, in the second link, only the second wall 97 (as well as another second wall 97$s$, symmetrical to the second wall 97 and belonging to the other half-link, 90$s$) connects directly to the proof mass 4.

As indicated above, in the different embodiments represented, the second link 9; 19; 29; 39 comprises two half-links 90, 90$s$. The first half-link (90, in FIG. 13) comprises the first wall 91; 391, and the second wall 97 mentioned above. The second half-link (90$s$, in FIG. 13) comprises:

a first additional wall 91$s$, perpendicular to the second of rotation, $\Delta_2$, and a second additional wall 97$s$, parallel to the second axis of rotation, $\Delta_2$, the first additional wall 91$s$ and the second additional wall 97$s$ connecting perpendicularly to each other and connecting, as regards one, to the lever 7 and, as regards the other, to the proof mass 4, the second wall 97 and the second additional wall 97$s$ being located as an extension of each other.

Here, the second wall 97 and the second additional wall 97$s$ are aligned with each other, and each extend along the second axis of rotation $\Delta_2$.

In the different embodiments represented, the second wall 97 extends, in parallel to the axis Y:

from a first end 98, through which the second wall connects directly and rigidly to the first wall 91; 391 (forming an embedment, from a mechanical point of view), to a second end 99 through which the second wall 97 connects directly and rigidly to the proof mass 4.

As for the first wall 91, in the first three embodiments (FIGS. 13 to 16), it extends:

from a first end 92, connected to the lever 7 either directly and rigidly (FIGS. 15 and 16), or connected to the lever via a first connecting wall 94 (FIGS. 13, 14), to a second end 93, also connected to the lever 7, either directly and rigidly (FIG. 16), or via a second connecting wall 95 (FIGS. 13, 14 and 15).

The axis which connects the first end 92 to the second end 93 is parallel to the lever 7.

In these first three embodiments, the first end 98 of the second wall connects (directly and rigidly) to the first wall 91 in a median zone of the first wall 91, between the first and second ends 92, 93 of the first wall. As indicated above, the first and second walls together are then shaped like an (inverted) T.

In the fourth embodiment (FIG. 17), the first wall 391 extends:

from a first end 392, connected directly and rigidly to the lever 7, to a second end 393, connected (directly and rigidly) to the first end 98 of the second wall 97.

The axis which connects the first end 392 to the second end 393 is again parallel to the axis X (strictly speaking, parallel to the axis X when the lever is at rest, aligned with the axis X).

In the different embodiments considered here, the first and second walls are thin.

In this respect, it will be noted that FIGS. 13 to 17 are top views (the plane of the figure being parallel to the axes X and Y on each occasion), so that the extension along the axis Z of the first and second walls, $t_{MEMS}$, is not visible in these figures (which extension is, in this case, significantly greater than the width of these walls). These figs additionally show the links 9; 19; 29; 39 in a rest position, in which the proof masses, the frames and the lever are stationary, occupying their rest position.

In these different embodiments, the second wall 97 has, in parallel to the second axis of rotation $\Delta_2$, between its two ends 98 and 99, a length b greater than twenty times its width a (i.e. greater than twenty times its extension along the direction X), or even greater than forty times its width a. Furthermore, along the direction Z, it extends over a thickness $t_{MEMS}$ greater than four times its width a, or even greater than ten times its width a.

By way of example, the length b of the second wall may be between 30 and 150 microns. Its width a can be between 0.5 and 5 microns, and its thickness $t_{MEMS}$ can be between 5 and 100 microns.

In the different embodiments considered here, the first wall 91; 391 has, between its first end 92; 392 connected to the lever and the junction with the second wall 97, a length greater than twenty times its width c (i.e.: greater than twenty times its extension along the direction Y), or even greater than forty times its width c. In the case of the first, second and third embodiments, the first wall 91 thus has, between its two ends 92 and 93, a total length d greater than forty times, or even eighty times, its width c.

By way of example, the total length d of the first wall may be between 50 and 200 microns. Its width c can be between 0.5 and 5 microns.

Furthermore, along the direction Z, the first wall 91; 391 also extends over a thickness $t_{MEMS}$ greater than four times its width c or even greater than ten times its width c. This thickness may, again, be between 5 and 100 microns, for example.

Whatever embodiment is considered, the first and second walls are delimited by a lower edge (on the support side), and, opposite to this, by an upper edge, both of which are free edges (i.e. free to move, as they are not linked, at least not directly, to any other element of the gyrometer).

As indicated above, in the first embodiment (FIGS. 13 and 14), the first and second ends 92 and 93 of the first wall 91 connect to the lever 7 via the first connecting wall 94 and the second connecting wall 95 respectively. These two connecting walls are each parallel to the second wall 97. They are shorter, for example at least two or three times shorter than the second wall (i.e.: of extension f, in parallel to the axis Y, at least two or three times smaller than the length b of the second wall). They each connect to the first wall perpensions of the different elements of this link are shown in FIG. 2. The values of these dimensions are also given in Table 1, in microns.

The values of the stiffness coefficients $k_X$, $k_Z$ and $C_Y$ corresponding to these dimensions are given in Table 2, both for the present link, 9, and for that of prior art, 9aa. The values of these stiffness coefficients have been obtained by numerical simulation.

The stiffness coefficient $k_X$ is the stiffness coefficient of the link (expressed, for example, in Newtons per metre) with respect to a relative displacement, between the mass and the lever, along the axis X. The stiffness coefficient $k_Z$ is the stiffness coefficient of the link with respect to a relative displacement, between the mass and the lever, along the axis Z. And the stiffness coefficient $C_Y$ is the rotational stiffness coefficient of the link (expressed, for example, in Newtons·metres per radian), with respect to a rotation of the mass relative to the lever about the axis $\Delta_2$.

Table 2 also indicates the value of a non-linearity coefficient NL. This coefficient is equal to the relative difference (in %) between: on the one hand, the spring force (directed along the axis X) corresponding to a stretch of 5 microns in the direction X, and, on the other hand, the value kX×5 microns (i.e.: deviation between the spring force and the straight line which, for small stretches, best describes the force-stretch relationship along the axis X, for a link stretch of 5 microns).

TABLE 1

|  | a | b | c | d | e | f | g | l | m | n | $t_{MEMS}$ |
|---|---|---|---|---|---|---|---|---|---|---|---|
| Prior art (link 9aa) | 4.8 | 176 | 12 | 12 | 13 | 17.8 | 400 | 100 | 2 |  | 20 |
| link 9 | 1 | 55 | 1 | 82 | 1 | 11 | 20 | 10 | 10 | 100 | 20 | dicularly to this wall, and, opposite to this, they each connect rigidly to the lever 7. As explained in the "summary" section, these connecting walls make it possible to improve linearity of the spring force-displacement relationship along X, for link 9. The width e and thickness of the connecting walls are comparable (for example identical) to the width c and thickness of the first wall. In the same way, the first additional wall 91s extends, in parallel to X, from a first end to a second end, these two ends connecting to the lever 7 by means of a first additional connecting wall 94s and a second additional connecting wall 95s respectively. These two connecting walls 94s, 95s are each parallel to the second additional wall 97s, and are shorter, for example at least two or three times shorter than the second additional wall.

The second embodiment of the second link (FIG. 15) is identical to the first embodiment, except that the first end 92 of the first wall 91 connects directly and rigidly to the lever 7, instead of connecting thereto via a connecting wall.

The third embodiment of the second link (FIG. 16) is identical to the first embodiment, except that the first and second ends 92, 93 of the first wall 91 each connect directly and rigidly to the lever, instead of connecting thereto via a connecting wall.

A complete numerical example is now set forth, byway of illustration, for the first embodiment of link 9 (FIGS. 13 and 14). The dimensions of the different elements of link 9 are shown in FIG. 14. The values of these dimensions are given in Table 1, in microns.

A numerical example corresponding to link of prior art in FIG. 2 is also set forth by way of comparison. The dimen-

TABLE 2

| stiffness | Prior art (link 9aa) | link 9 (parameters from table 1) | ratio |
|---|---|---|---|
| $k_X$ (N/m) | 52 | 13 | 4 times smaller |
| $k_Z$ (N/m) | 780 | 1211 | 1.5 times greater |
| $C_Y$ (Nm/rad) | 5.2E−7 | 1.06E−8 | 58 times smaller |
| NL (% F(@5 μm)) | 0.15% | 17% | 113 times greater |
| $k_X$ × NL (N/m) | 0.08 | 2.2 | 28 times greater |

As can be seen from this example, the link 9 effectively provides a low stiffness coefficient $k_X$, a high stiffness coefficient $k_Z$ and a low stiffness coefficient $C_Y$. In particular, the value of the stiffness coefficient $C_Y$ is significantly lower than for the link 9aa of prior art, which substantially increases sensitivity of the gyrometer.

In terms of non-linearity, however, the performance of link 9 is less good than that of the link 9aa of prior art. However, this performance is still much better than what would be obtained with a single flexible wall (parallel to the plane Y,Z) embedded at its two ends. In addition, for link 9, the fairly high value of the coefficient NL finally does not have as great an impact as it might appear at first sight, as the coefficient $k_X$ is lower than in prior art. Indeed, for the oscillation dynamics of the mass 4-frame 3 assembly, the total X stiffness, due not only to the link 9 (or 9aa), but also, and above all, due to the springs 10 which link the frame to the support should be taken into account. It is therefore in relation to this total stiffness that the non-linearity introduced by link 9 (or 9aa) should be evaluated. And as the coefficient $k_X$ is low, for link 9 (lower than for link 9*aa*), the non-linear term $k_X \times NL$ (%), to be compared with the total stiffness along X, is not as high as the value of NL (%) would suggest.

For dimensioning the link 9 corresponding to the values in Table 1, the non-linearity of the spring force along the axis X nevertheless remains relatively high. This non-linearity can be decreased by increasing the length of the walls 91, 97 of link 9, as can be seen in Table 3, which gathers the values of the coefficients $k_X$, $k_Z$, $C_Y$ and NL for three different dimensioning items of link (configurations 1 to 3). In Table 3, the values for dimensions a to f are again given in microns. The values for the other dimensions are the same as for Table 1.

The main difference between configurations 2 and 3 is the length f of the connecting walls 94 and 95 (15 microns for configuration 2 and 30 microns for configuration 3). This difference enables the NL coefficient to be reduced from 8% to 5%, which clearly shows that the flexibility of the connecting walls 94, 95 effectively helps to reduce non-linearity of the link, which has already been made acceptable (compared to a single flexible wall such as the second wall) by virtue of the addition of the first wall 91. It is also noted that, for the example corresponding to configuration 3, the $kX \times NL$ (%) term is only 2 to 3 times greater than for the link 9*aa* of prior art, while the rotational stiffness coefficient $C_Y$ is approximately 60 times lower than for the link 9*aa*.

TABLE 3

| Config. no | b | d | f | a, c, e | $k_x$ (N/m) | $k_z$ (N/m) | $C_y$ (Nm/rd) | NL (% F(@5 μm)) | $k_x \times NL$ (N/m) |
|---|---|---|---|---|---|---|---|---|---|
| 1 | 55 | 82 | 11 | 1 | 13 | 1211 | 1.06E–8 | 17% | 2.2 |
| 2 | 70 | 120 | 15 | 1 | 6 | 557 | 0.81E–8 | 8% | 0.5 |
| 3 | 80 | 120 | 30 | 1 | 4 | 398 | 0.70E–8 | 5% | 0.2 |

Figures 18, 19, 20, 21:
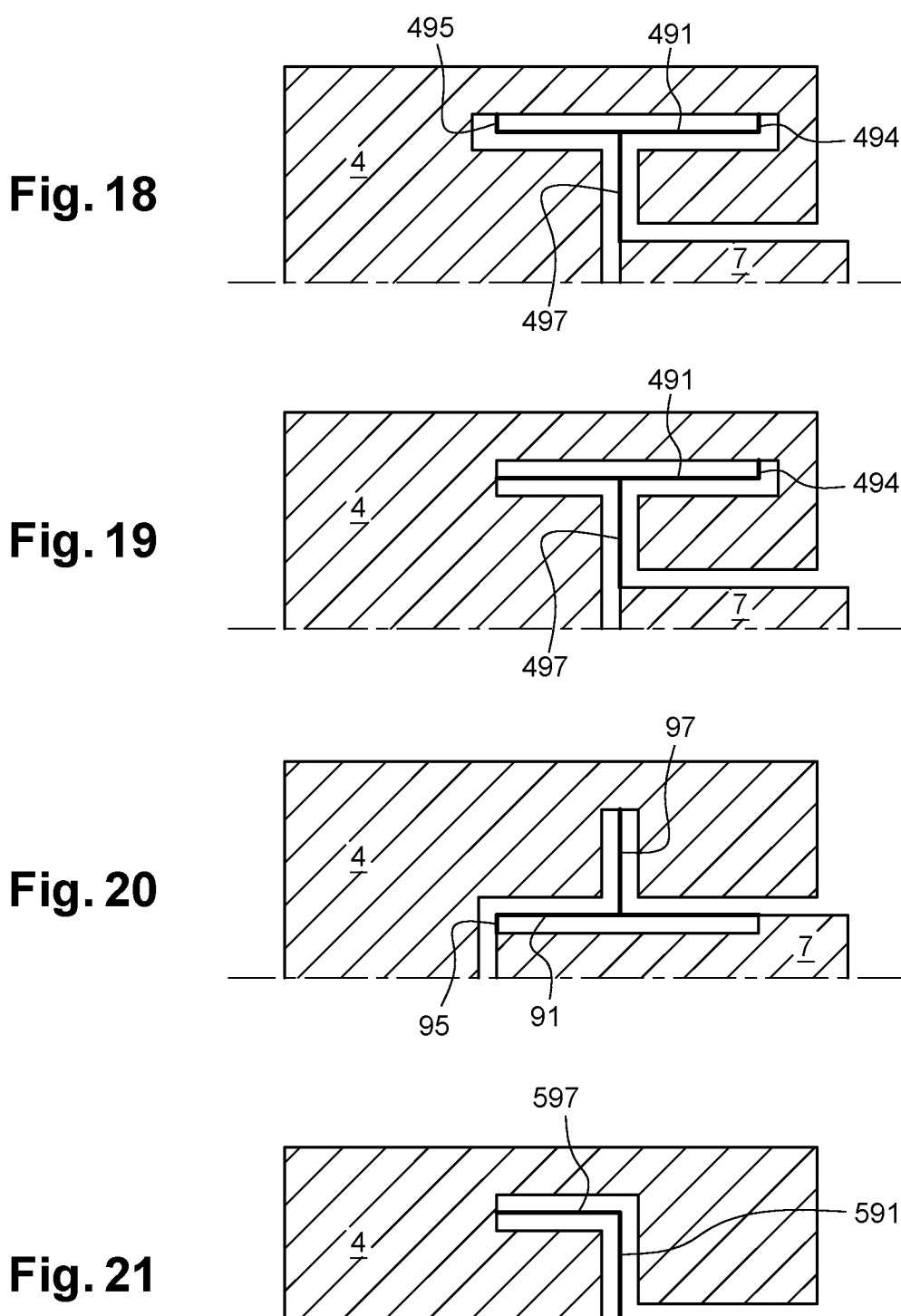
FIG. 18 schematically and partially represents a fifth embodiment of the mechanical link in question, in a top view.
FIG. 19 schematically and partially represents a sixth embodiment of the mechanical link in question, in a top view.
FIG. 20 schematically and partially represents a seventh embodiment of the mechanical link in question, in a top view.
FIG. 21 schematically and partially represents an eighth embodiment of the mechanical link in question, in a top view.

Different alternatives can be made to the gyrometer just described, in particular as regards the second link connecting the lever to the proof mass. Thus, in the examples set forth above, for embodiments 1 to 3, the first wall connects to the lever while the second wall (central bar of the "T", providing flexibility along X) connects to the proof mass. However, as already indicated, as an alternative, the first wall could be connected to the proof mass while the second wall would be connected to the lever (instead of vice versa). Thus, as illustrated in FIG. 18, there is a first wall 491 which connects to the proof mass 4 (here via two connecting walls 495 and 494) while the second wall 497 connects directly to the lever 7, the first and second walls additionally connecting to each other at right angles, for example forming a T. FIG. 19 illustrates an alternative to FIG. 18 in which the first wall is connected directly to the proof mass 4 at one end and via a connecting wall 494 at the other end.

FIG. 20 illustrates an alternative to FIG. 14 in which the first wall 91 connects via a connecting wall 95 to one end to the lever 7 and directly to the other end, while the second wall 97 connects directly to the proof mass 4, the first and second walls additionally connecting to each other at right angles.

FIG. 21 illustrates an alternative to FIG. 17 in which the first wall 591 connects directly to the lever 7 while the second wall 597 connects directly to the proof mass 4, the first and second walls also connecting to each other at right angles and forming an inverted L.

The articles "a" and "an" may be employed in connection with various elements and components, processes or structures described herein. This is merely for convenience and to give a general sense of the processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations.

The invention claimed is:

1. A microelectromechanical device comprising:
   a first frame,
   a first proof mass, connected to the first frame through a first mechanical link which allows pivoting of the first proof mass to relative to the first frame about a first axis of rotation parallel to a mean plane of the first frame, and
   a lever for detecting pivoting of the first proof mass, connected to the first proof mass through a second mechanical link allowing rotation of the lever relative to the first proof mass about a second axis parallel to the first axis,
   wherein the second mechanical link comprises:
      a first wall, perpendicular or substantially perpendicular to the second axis of rotation, and
      a second wall, perpendicular to the mean plane of the frame and in parallel or substantially in parallel to the second axis of rotation,
      the first wall and the second wall connecting to each other perpendicularly or substantially perpendicularly, the first wall connecting to the lever and the second wall connecting to the first proof mass,
   wherein the device further comprises:
      a second frame,
      a second proof mass, connected to the second frame through a first additional link which allows pivoting of the second proof mass relative to the second frame about a first additional axis of rotation, parallel to the first axis of rotation, and wherein the second proof mass is also connected to the detection lever through a second additional link allowing rotation of the lever relative to the second proof mass about a second additional axis of rotation parallel to the first axis of rotation,
      the lever being connected on one side to the first proof mass and on the other side to the second proof mass.

2. The device according to claim 1, wherein the first wall and the second wall are connected to each other to form a T.

3. The device according to claim 1, wherein:
   the first wall extends:
      from a first end, connected to the lever,
      to a second end, also connected to the lever, and wherein the second wall extends:

from a first end, through which the second wall connects to the first wall, in a median zone of the first wall, between the first end and the second end of the first wall, to a second end through which the second wall connects to the proof mass.

4. The device according to claim 3, wherein the first end of the first wall connects to the lever via a connecting wall, which extends from this first end of the first wall to the lever, in parallel or substantially in parallel to the second wall.

5. The device according to claim 4, wherein the second end of the first wall is connected to the lever by means of another connecting wall which extends from this second end to the lever, in parallel or substantially in parallel to the second wall.

6. The device according to claim 1, wherein the first wall connects to the lever, and the second wall connects to the proof mass, and wherein the first wall is connected to the proof mass only through said second wall.

7. The device according to claim 1, wherein the second mechanical link further comprises:

a first additional wall, perpendicular or substantially perpendicular to the second axis of rotation, and a second additional wall, in parallel or substantially in parallel to the second axis of rotation, the first additional wall and the second additional wall connecting perpendicularly or substantially perpendicularly to each other, the first additional wall connecting to the lever and the first additional wall connecting to the proof mass.

8. The device according to claim 1, wherein the first wall has, along a direction parallel to the lever, a length greater than twenty times a width that the first wall has along a direction perpendicular to the lever.

9. The device according to claim 1, wherein the second wall has, in parallel to the second axis of rotation, a length greater than twenty times a width that the second wall has in a direction perpendicular to the second axis of rotation.

10. The device according to claim 1, further comprising a support and wherein the first frame and the second frame are capable of being translationally guided relative to the support along an axis of displacement which is parallel to a mean plane of the first frame and which is perpendicular to the first axis of rotation.

11. The device according to claim 10, further comprising an electromechanical actuation system configured to impose oscillation to each of the first and second frames along said axis of displacement, the displacement of the first frame relative to the support and the displacement of the second frame relative to the support having a same amplitude and directions opposite to each other.

* * * * *